United States Patent [19]

Chung et al.

[11] 4,368,362
[45] Jan. 11, 1983

[54] AUTOMATIC TELEPHONE LOADED/NONLOADED FACILITY TYPE IDENTIFICATION CIRCUIT

[75] Inventors: Li-Jin W. Chung, Burlington, N.C.; Ernest P. Moore, Berkeley Heights, N.J.; Glendon R. Porter, Denville, N.J.; Joseph F. Rizzo, Lodi, N.J.

[73] Assignee: Bell Telephone Laboratories, Incorporated, Murray Hill, N.J.

[21] Appl. No.: 173,020

[22] Filed: Jul. 28, 1980

[51] Int. Cl.³ .............................................. H04B 3/20
[52] U.S. Cl. .............................. 179/170.2; 179/170 D
[58] Field of Search .............. 179/170.2, 170.6, 170.8 179/175.3 R, 175.31 E, 81 A, 170 D, 175.2 R; 324/57 R

[56] References Cited

U.S. PATENT DOCUMENTS 3,982,080  9/1976  Ukeiley ........................... 179/170 D
4,096,362  6/1978  Crawford ........................ 179/170 D
4,224,483  9/1980  Neigh et al. .................. 179/175.2 R
4,276,450  6/1981  Chowaniec ..................... 179/170 D Primary Examiner—Joseph A. Popek
Attorney, Agent, or Firm—Thomas Stafford

[57] ABSTRACT

A bidirectional transmission path is typically coupled to unidirectional receive and transmit paths to effect amplification in repeaters or the like. A determination of whether the bidirectional path includes either loaded or nonloaded type 2-wire cable is made by inserting a test signal having a predetermined frequency and a predetermined amplitude into the receive path and measuring the peak amplitude of a transmit signal developed on the transmit path. If the transmit signal peak amplitude is greater than a predetermined threshold value, the 2-wire cable is considered loaded type, and if the transmit signal peak amplitude is less than the threshold value, the 2-wire cable is considered nonloaded type.

5 Claims, 4 Drawing Figures

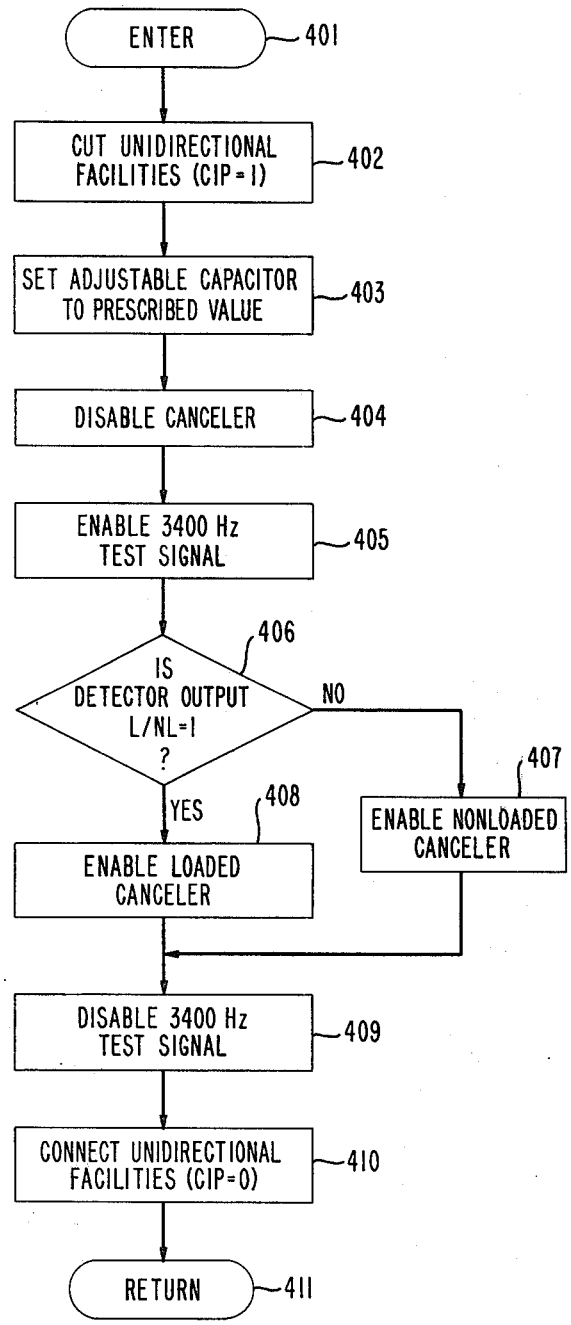

Accordingly, shown in FIG. 1 is coupling circuit 101 including transformer 102 having a first winding 103 and a second winding 104. Winding 103 is adapted to be connected via terminals T and R to a bidirectional transmission path or facility, for example, two-wire loaded or nonloaded telephone cable. Included in winding 103 is the usual midpoint capacitor employed in well-known fashion to extract signaling information. Winding 104 is adapted to be connected to receive and transmit unidirectional transmission paths or facilities. Although winding 104 is shown as being connected in single-ended configuration, it may equally be connected in a balanced configuration, as will be apparent to those skilled in the art. Transformer 102 may be any one of numerous coupling transformers known in the art and, preferably, has a 1:1 turns ratio.

A first terminal of winding 104 is connected to a reference potential point, for example, ground potential, while a second terminal of winding 104 is connected to adjustable capacitor 105, one input of gain unit 106 and one terminal of resistor 107. The output of gain unit 106 is adapted to be connected via terminal 116 to a transmit unidirectional path or facility and is connected to detector 108. Similarly, one input of gain unit 109 is adapted to be connected via terminal 110 to a receive unidirectional path or facility. The output of gain unit 109 is connected to a second terminal of resistor 107 and to an input of canceler circuit 111. An output from canceler circuit 111 is connected to a second input of gain unit 106. An output of test signal source 112 is connected to a second input of gain unit 109.

Control unit 114 generates signals for controlling operation of the transmission network, in accordance with the invention, to automatically identify the type of bidirectional transmission path or facility connected to terminals T and R. To this end, control signals are extended to adjustable capacitor 105, gain unit 109, canceler 111, and signal source 112, and output L/NL from detector 108 and output TCLK from source 112 are supplied to control unit 114. A signal for initiating operation of the circuit either automatically or manually is supplied via start terminal 115.

Control unit 114 includes a microcomputer arrangement, for example, an Intel 8748 unit commercially available. For additional details of control unit 114, see our copending applications filed concurrently herewith, Ser. Nos. 173,011 and 173,014.

Signal source 112 under control of signals from control unit 114 supplies a test signal having a predetermined frequency and amplitude to the second input of gain unit 109 and, hence, to the receive transmission path. Since the test signal is inserted into the receive path of the coupling circuit and, hence, supplied via coupling circuit 101 to the bidirectional path or facility, the need for connecting a measurement circuit directly to the bidirectional path or facility is eliminated. Signal source 112 may be any of numerous arrangements known in the art capable of controllably supplying a desired test signal. In this example, not to be construed as limiting the scope of the invention, the test signal supplied by source 112 has an amplitude of 1 volt peak and a frequency of 3400 Hz. The reason for selecting a test signal having a frequency of 3400 Hz is discussed below in relation to FIG. 3. Signal TCLK supplied from source 112 is a pulse signal having a frequency equal to the test signal and is employed in control unit 114 for synchronization.

Canceler circuit 111 includes active impedance circuits having transmission characteristics to match loaded or nonloaded bidirectional cables connected via terminals T and R. Details of the canceler circuits are not necessary to an understanding of the operation of the present invention. However, it should be noted that canceler 11 includes arrangements which in response to control signals from unit 114 controllably connect or disconnect the desired impedance circuits between the output of gain unit 109 and the second input of gain unit 106. In the operation of this invention, the canceler path is open circuited via signals from control unit 114. Details of loaded and nonloaded canceler circuits are shown in our copending applications, Ser. Nos. 173,011 and 173,014, respectively, cited above.

Similarly, details of adjustable capacitor 105 are not needed for an understanding of the present invention. It is noted, however, that in operation of the invention, adjustable capacitor 105 is adjusted via signals from control unit 114 to a prescribed value. In an example from experimental practice, the capacitance value is set to 0.006 microfarads. Details of an adjustable capacitor are also shown in our copending applications Ser. Nos. 173,011 and 173,014 cited above.

Gain units 106 and 109 are substantially unidirectional amplifiers of the differential type commonly referred to as operational amplifiers now well known in the art. Gain unit 109 also includes a switching arrangement to disconnect the receive path during operation of the invention. This is effected via signal CIP from control unit 114.

FIG. 2 shows in simplified form details of detector 108. Accordingly, FIG. 2 shows buffer amplifier 201, full wave rectifier 202, peak detector 203 and comparator 204. Signals from the output of transmit gain unit 106 are supplied via buffer amplifier 201 to full wave rectifier 202. The rectified output from unit 202 is supplied to peak detector 203. In turn, the peak detector output signal is supplied to one input of comparator 204. A predetermined threshold level is established at a second input of comparator 204 via a voltage divider including resistors 205 and 206. The output from comparator 204 is a first signal, namely, a high state signal representative of a logical 1 when the output from peak detector 203 is greater than the threshold value, and the output from comparator 204 is a second signal, namely, zero, representative of a logical zero, when the output from peak detector 203 is less than the threshold value. Thus, by employing a predetermined threshold value which is in predetermined relationship to the amplitude of the test signal, the type 2-wire cable is determined. In an example from experimental practice, a threshold level of 0.53 volts d.c. is employed when a 1 volt peak test signal is utilized to satisfactorily distinguish between loaded and nonloaded cable. Further details of detector 108 are shown in our copending application Ser. No. 173,011 filed concurrently herewith.

FIG. 3 shows impedance vs. frequency characteristics for loaded and nonloaded transmission facilities, i.e., two-wire telephone cable in accordance with the relationship $V(dB) = ZC/(R+ZC)$, where R is the resistance of resistor 107 and ZC is the impedance developed across winding 104 when a bidirectional facility is connected to T and R (FIG. 1). It is readily seen that at a frequency of approximately 3400 Hz, the impedance or attenuation characteristics of the loaded facility and nonloaded facility are quite different. As is well known, the facility impedance connected to terminals T and R

AUTOMATIC TELEPHONE LOADED/NONLOADED FACILITY TYPE IDENTIFICATION CIRCUIT

CROSS-REFERENCE TO RELATED APPLICATIONS

Our copending U.S. patent applications Ser. Nos. 173,011 and 173,014 were filed concurrently herewith.

TECHNICAL FIELD

This invention relates to transmission networks and, more particularly, to automatic identification of telephone bidirectional facilities as including either loaded or nonloaded cable.

BACKGROUND OF THE INVENTION

In telecommunications systems, transmission facilities are known to include either loaded or nonloaded two-wire bidirectional cable. For two-wire cables having lengths greater than a prescribed minimum, it is common practice to employ signal repeaters. In so doing, it is typical to connect the two-wire bidirectional cable through a transmission network to unidirectional receive and transmit paths or facilities. The transmission network includes circuit arrangements for maximizing signal loss between the receive and transmit paths, thereby minimizing unwanted signal reflections, commonly referred to as echoes. When a loaded, two-wire cable is encountered, a first type circuit arrangement is employed tailored to the impedance characteristic of the loaded cable. Similarly, when a nonloaded cable is encountered, a second type circuit arrangement is utilized tailored to the impedance characteristic of the nonloaded cable.

Heretofore, office records were relied upon to identify whether the two-wire facility was either the loaded type or the nonloaded type. Such practice is somewhat satisfactory for repeater arrangements, which are manually connected and adjusted. Unfortunately, office records are often inaccurate or out of date; consequently, installation errors may occur, resulting in less than desirable transmission performance.

More recently, two-wire facilities have been identified as to type by employing an electronic measurement arrangement. The electronic measurement arrangement disclosed in U.S. patent application, Ser. No. 19,368, filed Mar. 12, 1979, by J. L. Neigh and R. G. Sparber, now U.S. Pat. No. 4,224,483, issued Sept 23, 1980, employs an impedance measuring circuit which is connected directly to the two-wire bidirectional facility. The measuring circuit includes a complex excitation signal generator and filter arrangement to form a feedback loop which oscillates at a given frequency. Phase relations imposed by the feedback loop resuult in the magnitude of the filter output signal being proportional to the real part of the two-wire facility load, which is driven by the excitation signal. Additionally, the circuit operation requires connection of a reference load and a capacitor charging circuit to establish a reference level to which the measured value is compared for determining whether the two-wire facility is a loaded or nonloaded type.

Connection of such arrangements directly to two-wire facilities typically requires the use of relays, or the like, which can withstand surge voltages sometimes found on subscriber facilities. Use of relays is undesirable because of their cost and space requirements. Moreover, switching of such arrangements onto the bidirectional facility creates undesirable noise. Thus, although this prior identification arrangement may be advantageously employed in some applications, it is undesirable for use in others, especially where space requirements dictate elimination of the relays and use of less complex circuit arrangements.

SUMMARY OF THE INVENTION

These and other problems of prior known facility type identification arrangements are overcome in a transmission network of the type including receive and transmit unidirectional paths or facilities adapted to be coupled to a two-wire bidirectional path or facility by inserting a test signal into the receive path or facility having a predetermined amplitude and frequency and by comparing the resulting so-called "transhybrid" signal developed in the transmit path or facility to a prescribed threshold value. If the amplitude of the transhybrid signal is greater than the threshold value, the bidirectional facility is considered to include a loaded cable, and if the transhybrid signal is less than the threshold value, the bidirectional facility is considered to include a nonloaded cable.

In a specific embodiment of the invention, the signal insertion and comparison is effected under control of a microcomputer, which also generates control signals for automatically connecting an impedance network in the transmission network corresponding to the type cable, i.e., loaded or nonloaded, that has been identified in the bidirectional facility.

BRIEF DESCRIPTION OF THE DRAWING

The invention will be more fully understood from the following detailed description of an illustrative embodiment thereof taken in connection with the appended figures, in which:

FIG. 4 shows a flowchart of a program routine including a sequence of steps employed in one embodiment of the invention for determining whether the bidirectional cable includes either loaded or nonloaded cable.

DETAILED DESCRIPTION

Figure 1:
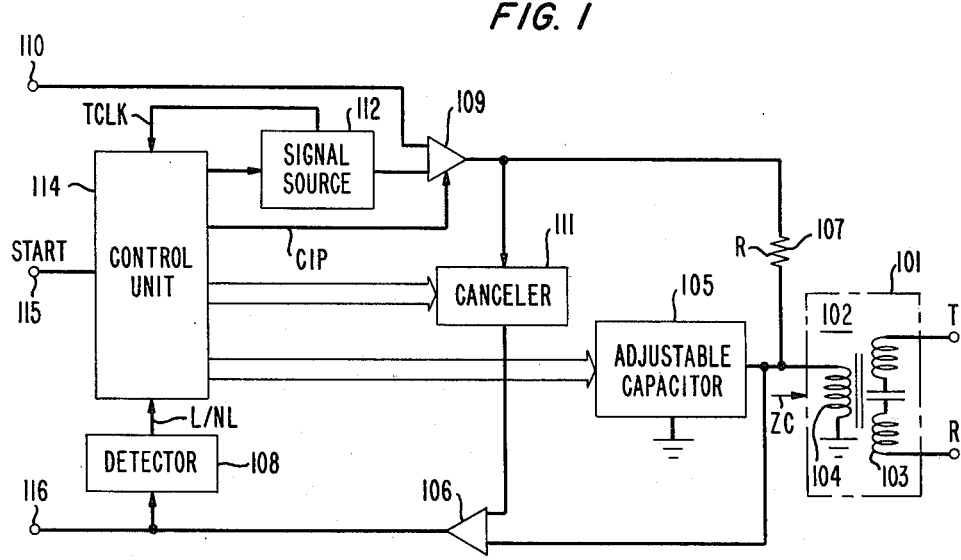
FIG. 1 shows in simplified block diagram form an arrangement for coupling a bidirectional transmission path or facility to unidirectional transmit and receive paths or facilities, including an automatic cable type identification arrangement, in accordance with aspects of the invention.
Figure 2:
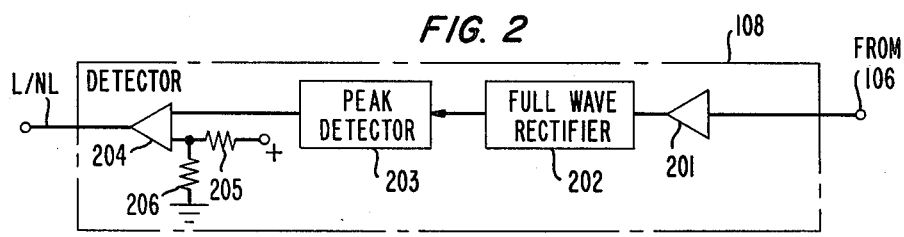
FIG. 2 depicts, in simplified form, the detector circuit used in FIG. 1.
Figure 3:
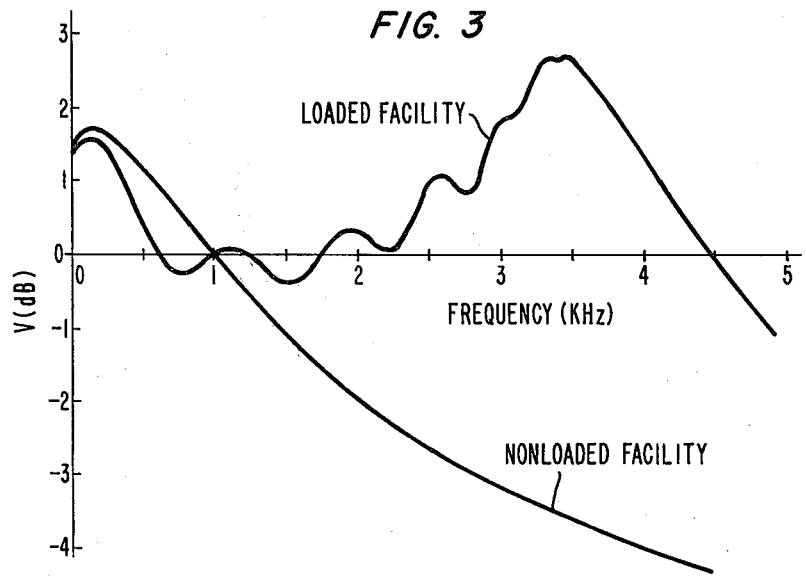
FIG. 3 graphically illustrates impedance vs. frequency characteristics for loaded and nonloaded facilities useful in explaining the operation of the invention.

FIG. 1 shows in simplified form a canceler type transmission network employed to couple receive and transmit unidirectional transmission paths or facilities to a bidirectional transmission path or facility including an automatic bidirectional cable type identification arrangement in accordance with the invention. Such networks are intended for use in two- to four-wire transmission networks, two- to two-wire telephone repeaters, and similar coupling and repeater arrangements in widespread use in telephone transmission systems.

of FIG. 1 is reflected and appears across second winding 104 and forms a voltage divider with resistor 107. Consequently, by inserting a test signal into the receive path, a signal is developed across winding 104 which is proportional to the impedance of the bidirectional facility connected to terminals T and R. Thus, by advantageously selecting the threshold level supplied to comparator 204 (FIG. 2), in accordance with the differences in the attenuation characteristics of the loaded and nonloaded facilities, they are readily distinguishable, in accordance with the invention. In this example, H88 loaded 2-wire cable is assumed. Although a test signal having a frequency of 3400 Hz is employed in this example, other frequency values may equally be employed, for example, frequencies in a range of 3200 Hz to 3600 Hz. However, the threshold level may differ slightly from the value used at 3400 Hz. Additionally, for certain other cable configurations employing other loading schemes the specific frequency and range of frequencies of the test may be different.

FIG. 4 shows a flowchart of the operation of the present invention under control of unit 114. Accordingly, the identification routine is entered via oval 401. Thereafter, control is transferred to operational block 402. Operational block 402 causes the unidirectional facilities to be cut via signal CIP being a logical 1. In this example, only the receive path is shown as being cut; however, in practice, the transmit path would also be disabled via an amplifier or switch arrangement not shown. Cutting of the unidirectional paths is important to minimize the effect of incoming noise or other signals and to minimize transmission of unwanted signals.

Operational block 403 causes control signals to be generated to set adjustable capacitor 105 to the prescribed value.

Operational block 404 causes control signals to be generated for disabling the loaded and/or nonloaded impedance circuits in canceler 111. That is to say, the canceler circuits are taken out of the signal path between gain unit 109 and gain unit 106.

Operational block 405 causes control signals to be generated and supplied to signal source 112 for enabling the 3400 Hz test signal which is supplied to a second input of gain unit 109 and, hence, inserted into the receive transmission path.

Conditional branch point 406 tests to determine whether output L/NL of detector 108 is a logical 1. As indicated above, L/NL being a logical 1 indicates that the bidirectional facility connected to terminals T and R is of the loaded type. Consequently, if the test result is "no," the bidirectional cable type is nonloaded, and control is transferred to operational block 407. If the test result is "yes," the bidirectional cable type is loaded, and control is transferred to operational block 408.

Operational block 407 causes control signals to be generated and supplied to canceler 111 for enabling the nonloaded canceler circuit to be connected in circuit between the output of gain unit 109 and the second input of gain unit 106.

Similarly, operational block 408 causes control signals to be generated and supplied to canceler 111 for enabling connection of the loaded impedance network between gain unit 109 and the second input of gain unit 106.

Operational block 409 causes a control signal to be generated and supplied to signal source 112 for disabling the 3400 Hz test signal.

Operational block 410 causes the unidirectional facilities to be reconnected via a CIP=0 signal.

Thereafter, control is returned to the main routine via oval 411.

We claim:

1. In a transmission network of a type adapted to connect a receive unidirectional transmission path and a transmit unidirectional transmission path to a bidirectional transmission path, apparatus for determining whether the bidirectional transmission path includes either a loaded type 2-wire cable or a nonloaded type 2-wire cable, characterized by, means for controllably generating and supplying a test signal having a predetermined frequency and amplitude to the receive unidirectional transmission path, means for detecting the amplitude value of signals on the transmit unidirectional path, and means for comparing said detected amplitude value with a predetermined threshold value, said comparing means generating a first output signal when said amplitude value is greater than said threshold identifying the bidirectional path as including 2-wire loaded type cable and a second output signal when said amplitude value is less than said threshold identifying the bidirectional path as including 2-wire nonloaded type cable.

2. Apparatus as defined in claim 1 wherein said test signal frequency is 3400 Hz.

3. Apparatus as defined in claim 1 wherein said test signal frequency is in the range between 3200 Hz and 3600 Hz.

4. Apparatus as defined in claim 2 or 3 wherein said threshold value is set at a value in predetermined relationship with said test signal peak amplitude.

5. A transmission network of a type adapted to couple a receive unidirectional transmission path and a transmit unidirectional transmission path to a bidirectional transmission path including, transformer means for coupling the bidirectional transmission path in circuit relationship to the receive path and the transmit path, canceler circuit means in circuit between the receive path and transmit path for generating a correction signal to be algebraically combined with a transmit signal for canceling an error signal developed in the network when the bidirectional path is connected to said transformer means, means for controllably connecting said canceler circuit means in and out of circuit between the receive and transmit paths, means for controllably generating and supplying to the receive path a test signal having a predetermined frequency and a predetermined amplitude, means for detecting signal amplitude in the transmit path, means for comparing said detected amplitude to a predetermined threshold value, said comparing means generating a first prescribed signal if the detected amplitude is greater than said threshold value and generating a second prescribed signal if the detected amplitude is less than said threshold value, and control means for generating control signals to control operation of said signal generation means and said canceler circuit connection means, said control means being responsive to said first or second prescribed signals to generate signals for connecting a loaded type canceler circuit of a nonloaded type canceler circuit, respectively, in circuit between said receive and transmit paths.

* * * * *